Figure 1:
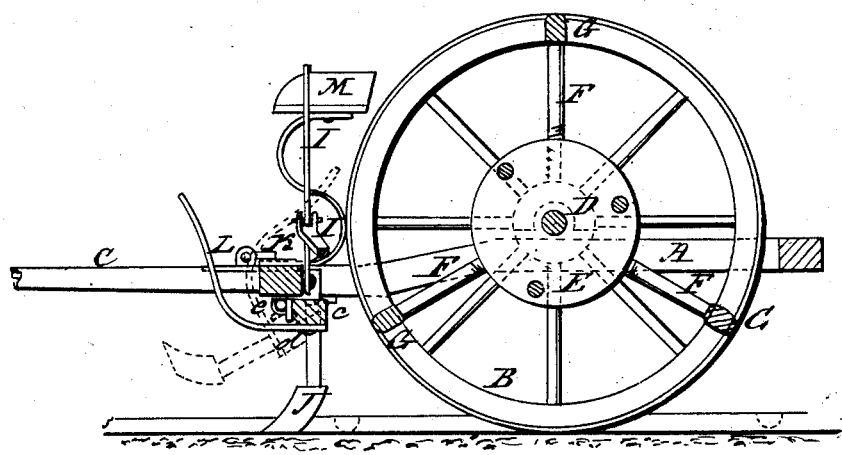

2 Sheets—Sheet 1.

DIKEMAN & HEWLETT.
Rotary Cultivator.

No. 35,087.

Patented Apr. 29, 1862.

Witnesses:

Inventors:

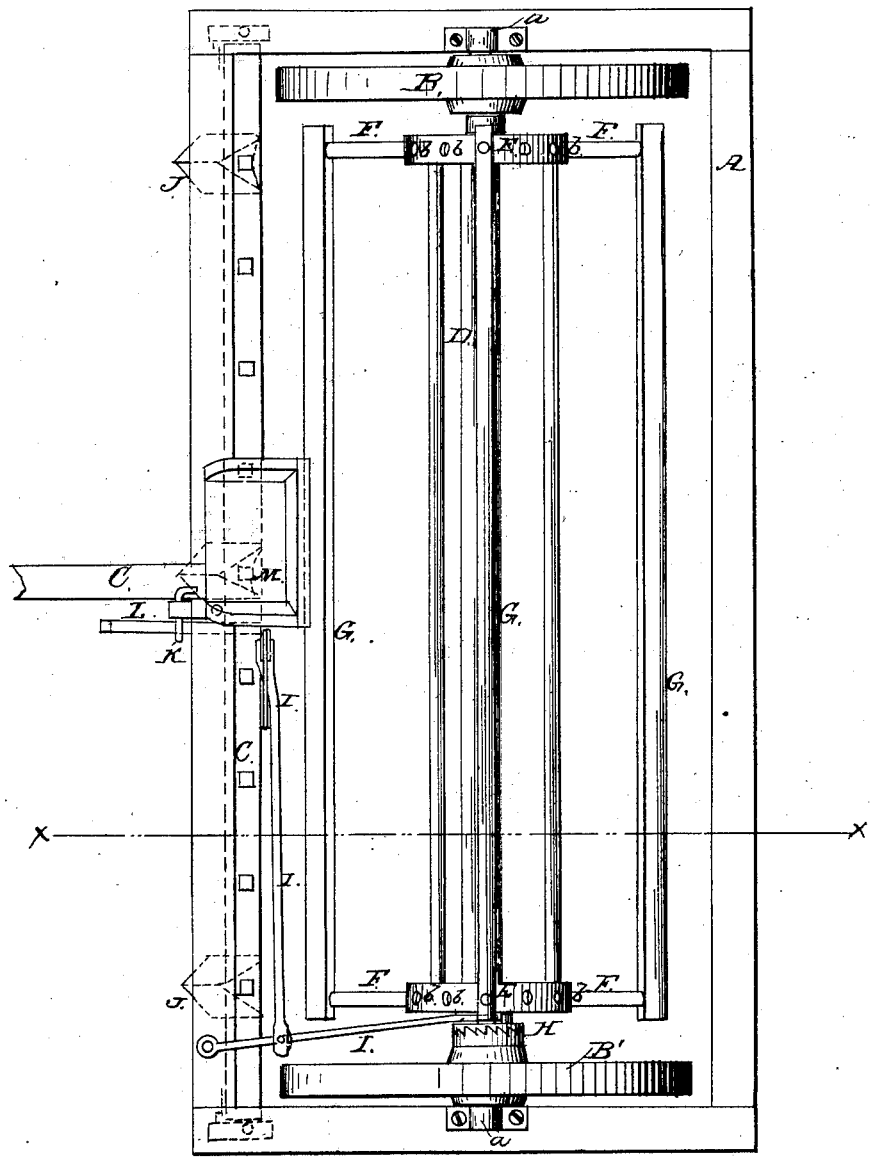

UNITED STATES PATENT OFFICE.

J. REMSEN DIKEMAN AND J. J. HEWLETT, OF HEMPSTEAD, NEW YORK.

IMPROVEMENT IN MACHINES FOR MARKING AND FURROWING LAND.

Specification forming part of Letters Patent No. 35,087, dated April 29, 1862.

*To all whom it may concern:*

Be it known that we, J. REMSEN DIKEMAN and J. J. HEWLETT, both of Hempstead, in the county of Queens and State of New York, have invented a new and Improved Machine for Marking or Furrowing Land in Check-Rows for the Planting of Corn and other Seeds; and we do hereby declare that the following is a full, clear, and exact description of the same, reference being had to the accompanying drawings, making a part of this specification, in which—

Figure 1 is a side sectional view of our invention, taken in the line $x\ x$, Fig. 2. Fig. 2 is a plan or top view of the same.

Similar letters of reference indicate corresponding parts in the two figures.

The object of this invention is to obtain a machine of simple and economical construction which will furrow or mark land in check-rows—that is to say, with marks or furrows crossing each other at right angles—and perform the work by a movement across the land in one direction only, and also be capable of being adapted to making the marks or furrows at different distances apart, as may be desired.

To this end the invention consists in the employment or use of a reel and shares attached or applied to a frame mounted on wheels, and all arranged as hereinafter fully set forth.

To enable those skilled in the art to fully understand and construct our invention, we will proceed to describe it.

A represents a rectangular frame, which is mounted on two wheels, B B', and has a draft-pole, C, attached to the center of its front part. The axle D of the wheels B B' is fitted tight in bearings $a\ a$ on the frame A, so that it will not rotate with them.

On the axle D there are fitted loosely two circular disks, E E, one near the hub of each wheel. These disks have holes $b$ made radially in them at equal distances apart and all around their peripheries, and in more or less of these holes rods F are fitted. The outer ends of the rods F of the two disks are connected by bars G, which are parallel with the front and back of the frame A, as shown in Fig. 2, and consequently the rods F of the two disks are in line with each other. The rods F are of such a length as to admit of the bars G projecting exactly to the peripheries of the wheels B B', so that they may touch the ground as the wheels B B' sink in the soft earth and mark it as the machine is drawn along, and the reel, which is composed of the disks, rods, and bars above described, rotated thereby.

The marks made by the bars G will of course be parallel with each other and at right angles to the draft movement of the machine, and said marks may be made at a greater or less distance apart, according to the number of bars G used. For instance, if four rods F be placed in each disk E at equal distances apart and the wheels B B' be twelve feet in circumference, the marks will be made just three feet apart. If two bars G only be used, the marks will be six feet apart. With six bars the marks will be two feet apart.

The reel is connected to one of the wheels, B', by means of a clutch, H, one part of which is formed on the inner end of a hub of one of the wheels, B', other parts being attached to one of the disks E. The disks E E being fitted loosely on the axle D, the reel is allowed a longitudinal movement thereon, and consequently, by means of the clutch H, may be connected to the wheel B', so as to turn with the wheel B, or be detached from said wheel, so as to be inoperative, by sliding the reel on the axle, so as to disengage the clutch, the reel being moved on the axle through the medium of levers I I I or other suitable means.

To a bar, $c$, at the front part of the frame A there are attached a number of shares or teeth, J, which may be of a shape similar to those used on cultivators or horse-hoes. These teeth have their tangs or shanks fitted in holes in the bar $c$, which holes are made at equal distances apart the whole length of said bar, in order to admit of the shares or teeth being placed at a greater or less distance apart, as may be desired. The bar $c$ has a journal, $d$, at each end of it, and these journals are fitted in bearings $e$, attached to the sides of the frame A, to admit of the bar $c$ being turned to adjust the shares or teeth J, so that they may penetrate the earth or be raised above it. (See Fig. 1, in which an elevated position of the shares or teeth J is shown in red.) The shares or teeth are retained in an elevated position by a catch or bolt, K, at the front part of the frame A, which bolt is so adjusted as to pass over a lever, L, which is attached to bar $c$ for the purpose of turning it.

The shares or teeth J mark the land or furrow it at right angles to the reel, and hence both marks or furrows are made by the movement of the machine in one direction only.

M is the driver's seat, placed at the front part of the machine.

In drawing the machine from place to place the reel is disconnected from wheel B' and the shares or teeth J elevated. The machine, it will be seen, is extremely simple in construction, and may be readily adapted so as to make the marks or furrows at the desired distance apart.

Having thus described our invention, what we claim as new, and desire to secure by Letters Patent, is—

The combination of a reel or revolving marker with shares or teeth J attached or applied to a frame mounted on wheels, and arranged to operate substantially as and for the purpose herein set forth.

J. REMSEN DIKEMAN.
JOHN J. HEWLETT.

Witnesses:
A. H. S. MOORE,
LEWIS H. CLOWS.